United States Patent [19]
Spatafore et al.

[11] Patent Number: 5,200,953
[45] Date of Patent: Apr. 6, 1993

[54] METHOD FOR PROGRAMMING A CONTENT ADDRESSABLE MEMORY (CAM)

[75] Inventors: Charles J. Spatafore, Poway; Dann P. McCreary, Escondido, both of Calif.

[73] Assignee: Integrated Networks Corporation, San Diego, Calif.

[21] Appl. No.: 776,574

[22] Filed: Oct. 15, 1991

[51] Int. Cl.$^5$ .............................................. H04J 3/24
[52] U.S. Cl. ............................ 370/85.12; 370/85.14; 370/85.15
[58] Field of Search ..................... 370/13, 85.1, 85.5, 370/85.12, 85.13, 85.14, 85.15, 94.1, 92; 340/825.05

[56] References Cited

U.S. PATENT DOCUMENTS 4,661,951  4/1987  Segarra ............................. 370/85.9
5,136,580  8/1992  Videlock eet al. ................ 370/94.1

OTHER PUBLICATIONS

Am99C10A, Advanced Micro Devices, Arrow Electronics, Inc., Publication #08125, Rev. E., Feb. 1990.
MU9C1480 LANCAM, MUSIC Semiconductors, Jan. 15, 1991.

*Primary Examiner*—Douglas W. Olms
*Assistant Examiner*—Melvin Marcelo
*Attorney, Agent, or Firm*—Nydegger & Associates

[57] ABSTRACT

A system for receiving data which is destined for station facilities on a ring-topology network includes a forwarding data channel for establishing data communication between the ring-topology network and the facilities. A station memory for selectively holding data to be transmitted from the facilities over the forwarding data channel and onto the network is also connected to the channel. Additionally, a processor, which generates and continually updates an instruction data frame with address information about the facilities is connected to the station memory. A switch interconnects the forwarding data channel with the ring-topology network to selectively receive data onto the station's channel from the network. A content addressable memory (CAM), which is also connected with the forwarding data channel, receives instruction data frames from the processor, via the station memory over the channel, to control the switch in accordance with address information contained in the instruction data frame.

21 Claims, 2 Drawing Sheets

METHOD FOR PROGRAMMING A CONTENT ADDRESSABLE MEMORY (CAM)

FIELD OF THE INVENTION

The present invention pertains generally to data communications equipment. More particularly, the present invention pertains to switching equipment that is useful for receiving data from a network. The present invention is particularly, but not exclusively, useful for updating the content addressable memory (CAM) which controls the switching element of a station that is attached to a data communications network.

BACKGROUND OF THE INVENTION

The use of networks to interconnect various station facilities in a data communications system is well known and is widely practiced. Examples of ring-topology networks include the ISO 8802-5 (1989) Token Ring Network and the ANSI X3.139-1987 Fiber Distributed Data Interface (FDDI). A non-ring topology network which may be given as an example is the ETHERNET type network. Regardless of the particular topology, however, a network which interconnects various station facilities is designed and intended to carry a substantial amount of traffic. Indeed, far more traffic is carried over the ring-topology network than can effectively be handled by any one station. Consequently, efficiencies dictate that each station on the network be able to rapidly perform at least two functions. First, each station must be able to readily identify the data which is destined for facilities at that particular station. Second, they must then receive only that data. Additionally, for some ring-topology networks, it is necessary for the station to also strip from the network data which originated at the station.

Electronic components, commonly known as Content Addressable Memories (CAM), are typically used for the address sorting function which is required at a station to identify data that is properly addressed to facilities at the station. In its operation, a CAM reviews and examines each frame of data that is transmitted over the network and compares the destination address of this data with the addresses of facilities which are known to be present at the particular station. If the facility is at the station, the frame of data is recognized by the CAM and the frame is copied to the destination facility. Otherwise, the frame is not copied and, instead, continues on the network.

In order for the CAM to efficiently and correctly select data from the network, address information in the CAM must be initially and periodically updated. This updating function is normally accomplished by a processor which is tied into direct communication with the CAM through dedicated circuitry. This dedicated circuitry, however, is typically part of a printed circuit board at the electronic interface between station and network and it usually occupies a substantial amount of space on the printed circuit board. Indeed, this dedicated circuitry can occupy sixteen or more pins. In any event, use of space for a dedicated purpose has consequent costs which should be avoided if possible.

A preferable alternative to dedicated circuitry is the use of a shared communications path. This is particularly so in the data communications field where compactness is a prerequisite. Accordingly, the present invention has recognized that a direct dedicated data communications link between a processor which accumulates address information about station facilities on a network, and a CAM which uses this address information to control the copying of data destined for facilities at the station, is not required. Instead, as recognized by the present invention, a preexisting communications path at the station can be effectively used for the transmission of address information from a processor to the CAM.

In light of the above it is an object of the present invention to provide a system for receiving data from a network destined for addressed facilities at a station on the network which effectively updates a content addressable memory with address information concerning the facilities at the station. Another object of the present invention is to provide a system for receiving data from a network destined for addressed facilities at a station on the network which reduces system componentry by sharing a common communications path at the station for the accomplishment of diverse functions. Still another object of the present invention is to provide a system for receiving data from a network destined for addressed facilities at a station on the network which effectively uses the network with minimal intrusion to accomplish the task of updating a station content addressable memory. Yet another object of the present invention is to provide a system for receiving data from a network destined for addressed facilities at a station on the network which is easy to implement, simple to use and relatively cost effective.

SUMMARY OF THE INVENTION

A system for receiving data which is destined for station facilities in a network includes a forwarding data channel to which other components of the system are either directly or indirectly attached. As intended for the present invention, this forwarding data channel serves as a shared communications path for interconnecting these various components of the system. Additionally, it serves to establish data communication between the network and the various station facilities.

In the system, a processor controls the forwarding data channel. A station memory for temporarily holding data to be transmitted onto the network from the various station facilities is interconnected between the forwarding data channel and the processor. As the station facilities generate traffic which is to be transmitted over the network, the station memory temporarily holds this traffic until it can be transmitted onto the ring network. While this traffic is being held in the station memory, the processor compiles address information about the facilities and uses the address information from the station memory to generate an instruction data frame.

A content addressable memory (CAM), which controls a switch to selectively copy data from the ring network, is also connected so as to monitor the forwarding data channel. A purpose of this connection is to allow the CAM to receive instruction data frames which are sent to the CAM from the processor via the station memory for controlling the switch.

In the operation of the system of the present invention, the purpose is to properly identify data on a network which is destined for a particularly addressed facility. To do this, the destination address of the data must be properly identified. This requires that the station where the destined facility is located knows of the existence of the facility. Consequently, the facility must somehow make its presence known to the station. This is done by interrogating data sent for transmission by the station facilities. Specifically, the data traffic which is to be sent from a facility is temporarily held at the station which connects the facility to the network. In accordance with standard procedure, the data is held at the station memory until it can be transmitted over the network under the particular protocol of the ring network. While being held at the station memory, the source address of the data is transferred to the processor.

Address information which is collected from the source addresses of data traffic that has been held in the station memory, is compiled by the processor. The processor then generates and formats an instruction data frame in the station memory containing this address information. Periodically, an updated instruction data frame is transmitted from the station memory onto the network. More specifically, the instruction data frame is first transmitted from the station memory onto the forwarding data channel. Thus, the content addressable memory (CAM) receives and copies the instruction data frame as it is released from the station for transmission over the network. Since, in the case of a ring-topology network, the instruction data frame is addressed back to the station processor which originated the frame, the frame will circulate around the ring without being copied elsewhere. It will then return to the station and be stripped from the ring. During this process, however, the CAM has received the updated instruction data frame.

As the CAM receives instruction data frames from the processor, it creates a directory of these addresses from the address information contained in the instruction stream within the data field of the frame. This directory will include addresses of all facilities which transmit from the station onto the ring. Consequently, when data frames which are being transmitted on the network arrive at the station, a switch receives the data frame and the destination address of the data frame is compared to the directory in the CAM. If the data frame is properly destined for a facility at the station, i.e. the destination address of the data frame is in the CAM, then the data will be passed along the forwarding data channel to the facility. Additionally, if the data frame originated at the particular station, the CAM will cause the switching element to receive and strip the frame from the network. On the other hand, if the destination address of a data frame being transmitted on the network is not contained in the CAM's directory, the frame is not copied at the station.

The novel features of this invention, as well as the invention itself, both as to its structure and its operation will be best understood from the accompanying drawings, taken in conjunction with the accompanying description, in which similar reference characters refer to similar parts, and in which:

DESCRIPTION OF THE PREFERRED EMBODIMENTS

Figure 1:
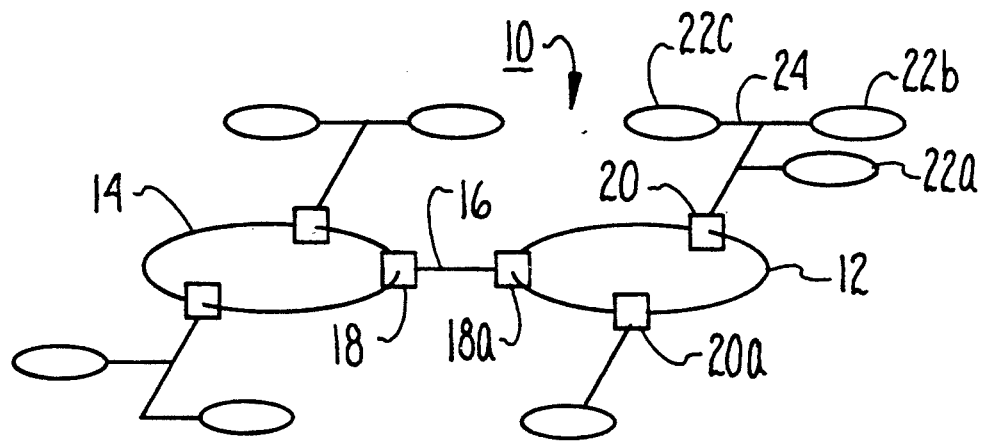
FIG. 1 is a schematic drawing of a data communications network including a pair of ring-topology networks and their attached peripheral networks and facilities.

Referring initially to FIG. 1, a data communications network is shown and generally designated 10. More specifically, the data communications network 10 is shown to include two ring-topology networks 12 and 14. As indicated above, the ring networks 12, 14 can be a Token Ring Network, a FDDI network or any other ring type network. As shown, the ring networks 12 and 14 are connected to each other via a bridge 16 which is respectively attached to the ring networks 12 and 14 by stations 18 and 18a. Additionally, FIG. 1 shows that stations 20 and 20a are attached to the ring network 12 and, specifically, that the station 20 connects the ring network 12 to a group of facilities 22 a,b and c by way of a communications line 24. Although ring networks are shown and discussed here, it is to be appreciated that the present invention is also effective for use with non-ring topology networks.

Figure 2:
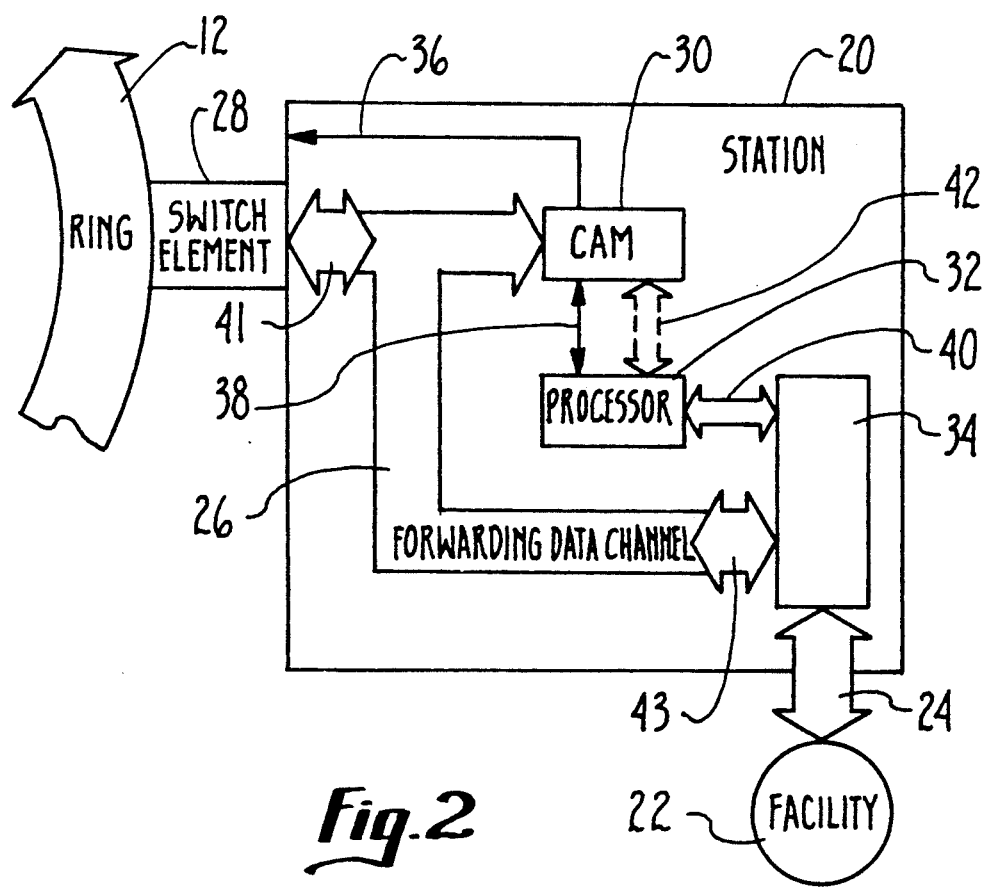
FIG. 2 is a schematic drawing showing the interconnections of the componentry of the system of the present invention for updating and programming a content addressable memory.

The schematic arrangement for the data communications network 10 shown in FIG. 2 is only exemplary. The arrangement of ring networks 12, 14 with attached stations 18, 18a, 20, 20a and associated facilities 22a,b,c is arbitrary and can be rearranged according to the needs of the particular network. The exact arrangement, of course, will depend on numerous factors, such as the number of ring networks to be used and the nature of the facilities 22 a,b and c. Regardless of these factors, the various stations 18, 18a, 20, 20a are substantially similar to each other, at least insofar as the implications of the present invention are concerned. This is so even though the stations 18, 18a may be modified according to the particular requirements for the bridge 16. Accordingly, the particular station 20 shown attached to ring network 12 in FIG. 1 is considered representative of the present invention as it applies to the recognition and routing of data traffic through the data communications network 10. A schematic diagram of station 20 is shown in FIG. 2.

FIG. 2 shows that a forwarding data channel (FDC) 26 is established within the station 20 for the flow of binary signals (e.g. data) between various components of the station 20. One of these components, the switch element 28, connects FDC 26 of station 20 into data communications with the ring network 12. According to established standards, the switch element 28 actually performs two separate functions. First, it allows the station 20 to receive data which is destined for a facility 22 at the station 20. Second, it allows the station 20 to strip data from the network 12 which originated at the station 20. For both cases, the switch 28 needs to be controlled with instructions from CAM 30.

Another component which is tied directly into the FDC 26 is a content addressable memory (CAM) 30. This CAM 30 is of particular importance for the present invention and is to be discussed in much greater detail below. Suffice it to say for now the CAM 30 is connected to FDC 26 and is thus able to receive communications from other components over the FDC 26. A station memory 34 is also connected to the FDC 26 and a processor 32 is connected to the station memory 34. Consequently, CAM 30, station memory 34, and processor 32 (indirectly through station memory 34) all have access to the FDC 26. Through switch 28 the FDC 26 can be placed in data communications with ring network 12.

Other connections between the various components at station 20 include a match line 36 which connects the CAM 30 with switch 28, a control line 38 which interconnects CAM 30 with the processor 32, and a data channel 40 which connects station memory 34 to the processor 32. In the prior art a data channel 42 (shown in phantom) was used to connect CAM 30 with the processor 32. This data channel 42, however, is obviated by the present invention. It is not needed for the operation of station 20, in fact, it is eliminated by the present invention, and is shown here (in phantom) solely to emphasize what can be eliminated through the efficiencies of the present invention. It may happen that if CAM 30 contains appropriate logic that recognizes the necessary instructions from processor 32, the control line 38 can also be eliminated. In which case, the only operative connection between CAM 30 and processor 32 will be through the FDC 26.

By way of summary, and with specific reference to FIG. 2, the FDC 26 is directly connected to the switching element 28, to CAM 30 and to station memory 34. As shown, the switching element 28 is connected to FDC 26 through a bi-directional connection 41 and the station memory 34 is connected to FDC 26 through a bi-directional connection 43. On the other hand, the CAM 30, since it does not need to transmit onto FDC 26, is only unidirectionally connected to FDC 26. This connection, however, allows the CAM 30 to receive data communications from the FDC 26. The processor 32 is connected in data communications with station memory 34 for both the transmission and receipt of data over the data channel 40. The station memory 34 is further connected for two-way data communications with the facilities 22 over communications line 24. Additional control for the elements is provided by the match line 36 which connects CAM 30 with switching element 28 and by the control line 38 which may, or may not, be used for direct control between CAM 30 and the processor 32.

This then is the basic manner in which the operative components of the station 20 are organized and interconnected. It is now important to appreciate how they cooperate with one another to keep the CAM 30 updated with address information from station memory 34.

Figure 3:
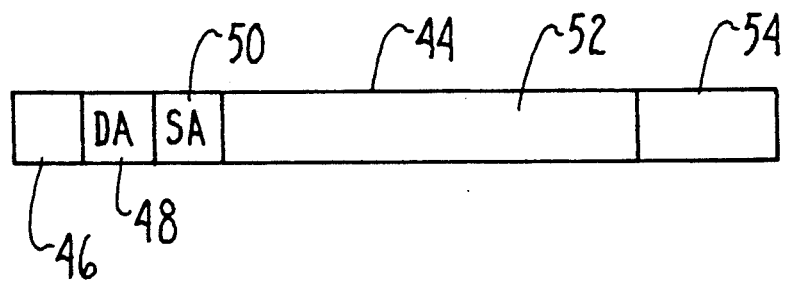
FIG. 3 is a conceptual representation of an instruction data frame of the present invention.

In accordance with referenced standards, the transfer of data over ring networks 12, 14 in a data communications network 10 is accomplished by grouping the binary signals which make up the data into data frames. These data frames all have similar formats and, within each frame, certain management functions must be accomplished regardless of the message data carried by the frame. Accordingly, the instruction data frame 44 shown in FIG. 3 has some similarities with normal data frames. But the dissimilarities are profound.

Unlike what might be considered a normal data frame for the transmission of data from one facility 22 to another over the ring network 12, the leader 46 for instruction data frame 44 is specific. In accordance with referenced standards, leader 46 is a NO-OP or VOID frame (FDDI). Furthermore, although the destination address (DA) packet 48 and the source address (SA) packet 50 are used, like any other data frame, there is one important difference. The difference is, for instruction data frame 44, the DA packet 48 is the same as SA packet 50. Stated differently, the source will send the instruction data frame 44 over the ring network 12 and back to itself. For the present invention, the source/destination is the processor 32. Consequently, in accordance with the component layout as schematically shown in FIG. 2, the instruction data frame 44 will pass first from processor 32 to station memory 34. The instruction data frame 44 will then be transmitted over FDC 26 to CAM 30 before it is released onto the ring network 12. The data packet 52 of instruction frame 44 can thus include data which is to be passed to CAM 30. At the end of instruction data frame 44 is the Ending Delimiter and Frame Status field 54 which is identical in all respects and functions to the same field of normal data frames.

Figure 4:
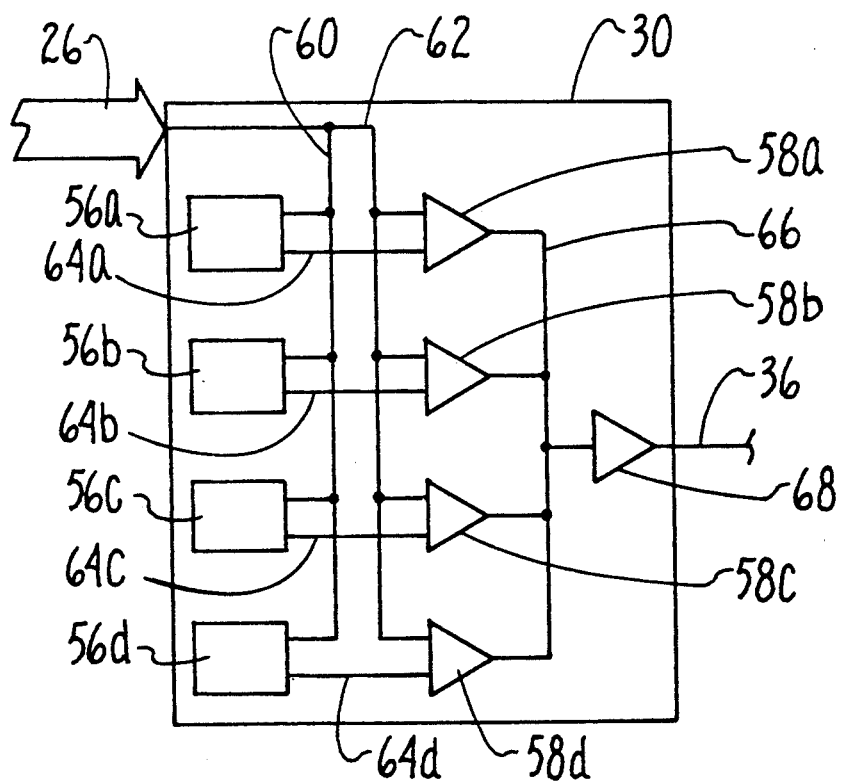
FIG. 4 is a schematic drawing of the content addressable memory of the present invention.

As indicated above, CAM 30 is of particular importance for the present invention because it controls switch 28 and, thus, the access from network 12 into station 20 for data destined for facilities 22 at the station 20. In FIG. 4, it is seen that the CAM 30 includes a directory comprising a plurality of address memories 56a,b,c, and d, each of which is capable of recording the address of one of the facilities 22 located at the station 20. As will be appreciated by the skilled artisan, the address memories 56a,b,c, and d are only exemplary and each CAM 30 will, in fact, have many more such address memories. CAM 30 also includes a plurality of comparators 58a,b,c, and d which are respectively connected through lines 64a,b,c, and d directly with a corresponding address memory 56. Like address memories 56a,b,c, and d, the comparators 58a,b,c, and d are also only exemplary. In any event, each address memory 56 will have a corresponding comparator 58.

Additionally, FIG. 4 shows that the CAM 30 is connected to the FDC 26 and that a line 60 provides a direct connection from the FDC 26 to each of the address memories 56a,b,c, and d. Similarly, a line 62 provides a direct connection from the FDC 26 to each of the comparators 58a,b,c, and d. In turn, all of the comparators 58a,b,c, and d are connected through a line 66 to an OR gate 68, and the output of the OR gate 68 is connected to the switch 28 over the match line 36.

Whenever an instruction data frame 44 is received from the processor 32 over FDC 26, the data 52 in instruction data frame 44 is passed along line 60 to the address memories 56a,b,c, and d. In accordance with instructions contained in the data 52, as generated by the processor 32, the address of a facility 22 which has traffic being held in station memory 34 will have this address recorded into the directory, if it is not already there. Thus, the directory of CAM 30 is updated every time processor 32 transmits an instruction data frame 44.

Whenever a data frame is received by the station 20 from the ring network 12, its destination address 48 information is transferred over the FDC 26 to CAM 30 and then along line 62 to the comparators 58a,b,c, and d. Each comparator 58 can then compare the incoming destination address with the address, if any, in its corresponding address memory 56 and determine whether there is a match. These comparisons at the various comparators 58a,b,c, and d occur simultaneously, and the results are transferred via line 66 to OR gate 68. In accordance with standard logical operations, OR gate 68 will generate a positive signal if any of the comparators 58a,b,c, or d indicate a match. Other wise, OR gate 68 will generate a negative signal. In either case, the signal is transferred over match line 36 to switch 28. For a positive signal, switch 28 will allow station 20 to copy the frame. For a negative signal, switch 28 will not copy and, instead, will ignore the data frame on ring network 12. A similar operation is applied to the source address 50 for every data frame received by station 20 from the ring network 12. If the data originated at the particular station 20, the source address match will cause the frame to be stripped from the network.

OPERATION

In the operation of the system of the present invention for updating CAM 30, it is perhaps easiest to first consider traffic which is generated by one of the facilities 22a,b,c at the station 20. Specifically, consider traffic from facility 22a. This traffic will be transferred over the communication line 24 as data frames in accordance with referenced standards. Since station 20 can only transmit onto the ring network 12 in accordance with a protocol for the ring network 12, the data from facility 22a will be held in station memory 34 until station 20 is allowed to transmit. During this short interval of time, the SA packet 50, which indicates the source address of the facility 22a that is transmitting the traffic, will be copied and transferred via data channel 40 to the processor 32. With this address information pertaining to facility 22a, and the address information which is provided by any other facility 22 which has traffic being held in station memory 34, the processor 32 generates an instruction data frame 44. Once generated, the instruction data frame is transmitted back to station memory 34.

When station 20 is allowed to transmit onto ring network 12, the instruction data frame 44 will be transmitted from the station memory 34 via FDC 26 to CAM 30 and then onto the ring network 12. During this transmission, the instruction data frame 44 is copied at the CAM 30 while being released onto the ring network 12. Because DA packet 48 of instruction data frame 44 indicates that frame 44 is destined for a return to station 20, the instruction data frame 44 will not be copied by any other station as it circulates around the ring network 12. When instruction data frame 44 returns to station 20 it will be stripped from the ring network 12 as will any other frame which originated from a facility 22 at the station 20. It happens that instruction data frame 44 occupies an insignificant bandwidth on the ring network 12. Nevertheless, by using this procedure, the instruction data frame 44 has been able to transmit valuable address information to CAM 30.

Typically, an instruction data frame 44 will be transmitted approximately once every minute. In this manner, CAM 30 can be periodically updated and made current as to the facilities which are attached to the station 20. This is particularly important for the selective reception of only that data from the ring network 12 which is destined for facilities at the station 20.

The periodic updating of CAM 30 with address information from the facilities 22 is important to help control the routing of traffic through the data communications network 10. For instance, consider again the facility 22a which earlier transmitted data traffic onto the ring network 12. Now, however, consider incoming traffic which is destined for the facility 22a. Because an instruction data frame 44 has already been sent from processor 32 over FDC 26 to CAM 30, one of the address memories 56 a-d will have recorded the address information in SA packet 50 from the data which was sent by facility 22a. For purposes of disclosure here, consider that address memory 56c contains address information on facility 22a. Then, whenever a data frame on ring network 12 is destined for the facility 22a, switch 28 will first send information concerning the destination address in this data frame to CAM 30. Inside CAM 30, this information will be simultaneously sent to all comparators 58a,b,c, and d. Only comparator 58c, however, will register a match. As a consequence, OR gate 68 will also indicate a match and the resultant positive signal from OR gate 68 is then sent over match line 36 to actuate switch 28. Switch 28 will then accept the incoming frame onto the FDC 26 for transmission to the facility 22a. Again, for the particular case where the data originated at the facility 22a, the data frame will be stripped from the ring network 12.

In the event a data frame circulating on ring network 12 does not have a destination address or a source address which compares with address information in the directory of CAM 30, the data frame will not be copied or stripped by the station 20 and, instead, will be ignored. This will happen because none of the comparators 58a,b,c, and d will match the address of the incoming frame with the address held in their respective address memories 56a,b,c, and d. There being no match, OR gate 68 generates a negative signal. This negative signal is then sent via match line 36 to actuate switch 28 so that the data frame is not accepted onto the FDC 26 for subsequent use within the station 20.

The efficiencies of the present invention reside in the ability of several components to effectively use the FDC 26 as their path for intercommunications. Specifically, the ability of the processor 32 to transmit information through station memory 34 and via FDC 26 to CAM 30 using an instruction data frame 44 effectively obviates the need for a direct dedicated data communications channel (e.g. data channel 42) between the processor 32 and the CAM 30.

While the particular system for receiving data from a ring-topology network which is destined for an addressed facility at a station on the ring network as herein shown and disclosed in detail is fully capable of obtaining the objects and providing the advantages herein before stated, it is to be understood that it is merely illustrative of the presently preferred embodiments of the invention and that no limitations are intended to the details of the construction or design herein shown other than as defined in the appended claims.

We claim:

1. A system for receiving data from a network destined for addressed facilities at a station on the network which comprises:

a forwarding data channel;

a switch connected to said forwarding data channel interconnecting said station with said network, said switch having an accept configuration for copying data destined for at least one said facility at said station, and a reject configuration for not copying data not destined for at least one said facility at said station back;

a content addressable memory connected to said forwarding data channel for identifying data properly destined for at least one said facility at said station, said content addressable memory being connected to said switch to appropriately control said switch between said accept configuration and said reject configuration; and a processor for generating address data indicative of said facilities at said station, and for transmitting said address data to said content addressable memory over said forwarding data channel to update said content addressable memory.

2. A system as recited in claim 1 further comprising a station memory for selectively holding data to be transmitted from said addressed facilities at said station onto said ring-topology network.

3. A system as recited in claim 2 wherein said station memory is connected to said forwarding data channel for data communications with said content addressable memory and said network.

4. A system as recited in claim 3 wherein said processor is connected in data communications to said station memory.

5. A system as recited in claim 4 wherein said address data is transmitted from said processor through said station memory and along said forwarding data channel to said content addressable memory.

6. A system as recited in claim 5 wherein said network is a ring-topology network and said address data is contained in an instruction data frame generated by said processor, said instruction data frame being sent to said content addressable memory and subsequently transmitted from said station around said ring-topology network for return to said transmitting station.

7. A system as recited in claim 6 wherein said station memory is connected to said processor for updating said processor with addresses of facilities using said system at said station to generate an updated instruction data frame.

8. A system as recited in claim 7 wherein said processor periodically transmits an updated instruction data frame.

9. A system as recited in claim 7 wherein said content addressable memory compares address data contained in said updated instruction data frame with the destination address of data on said ring-topology network to control said switch.

10. A system for receiving data which is destined for facilities located at a station that is attached to a network which comprises:
    a forwarding data channel for establishing data communication between said network and said facilities;
    means connected to said forwarding data channel for generating an instruction data frame containing address information about said facilities, and for transmitting said instruction data frame onto said network over said forwarding data channel;
    switch means connected with said forwarding data channel for selectively receiving data at said station from said network; and
    means connected with said forwarding data channel for receiving said instruction data frame to control said switch means in accordance with said address information in said instruction data frame.

11. A system as recited in claim 10 wherein said means for generating and transmitting said instruction data frame is a processor.

12. A system as recited in claim 11 further comprising a station memory connected to said forwarding data channel and to said processor for selectively holding data to be transmitted from said facilities over said forwarding data channel and onto said network.

13. A system as recited in claim 12 wherein said processor receives said address information from said station memory.

14. A system as recited in claim 10 wherein said switch means has an accept configuration for receiving data destined for at least one said facility at said station, and a reject configuration for not copying data not destined for at least one said facility at said station.

15. A system as recited in claim 14 wherein said means for controlling said switch means is a content addressable memory for identifying data properly destined for at least one said facility at said station, said content addressable memory being connected to said switch to appropriately control said switch between said accept configuration and said reject configuration.

16. A system for receiving data which is destined for facilities located at a station that is attached to a network which comprises:
    a forwarding data channel for establishing data communication between said network and said facilities;
    a station memory for holding data traffic to be transmitted on said network from any one of said facilities;
    a processor connected to said station memory for generating an instruction data frame with address information about said facilities contained in said data traffic, said processor controlling said station memory for transmitting said instruction data frame onto said network over said forwarding data channel;
    a switch connected with said forwarding data channel for selectively receiving data at said station from said network; and
    a content addressable memory having a directory, said content addressable memory being connected with said forwarding data channel for receiving said instruction data frame from said station memory and storing said address information from said instruction data frame in said directory, said content addressable memory also connected to said switch to control said switch means in accordance with said address information in said directory.

17. A system as recited in claim 16 further comprising a match line for connecting said content addressable memory to said switch, and said content addressable memory further comprises a plurality of comparators, and wherein a data frame from said network is sent from said switch to said content addressable memory over said forwarding data channel for simultaneous comparison with said directory by said plurality of comparators to generate a positive or a negative match signal, and wherein said match signal is sent via said match line from said content addressable memory to said switch to control said switch.

18. A system as recited in claim 17 wherein said instruction data frame includes a source address packet and a destination address packet and said source address is the same as said destination address.

19. A system as recited in claim 18 wherein an updated said instruction data frame is generated by said processor approximately every minute.

20. A system as recited in claim 19 wherein said directory comprises a plurality of address memories and each said address memory is connected with a respective said comparator, said address memories being used to hold address information on one said facility at said station.

21. A system as recited in claim 20 wherein said network is a ring-topology network and said instruction data frame is transmitted from said station and around said ring-topology network for return to said transmitting station.

* * * * *